United States Patent
McEwan (10) Patent No.: US 12,516,481 B2
(45) Date of Patent: Jan. 6, 2026

(54) SYSTEM AND METHOD FOR COLLECTING AND CONTAINING PET WASTE

(71) Applicant: Mitchell D. McEwan, Bountiful, UT (US)

(72) Inventor: Mitchell D. McEwan, Bountiful, UT (US)

( * ) Notice: Subject to any disclaimer, the term of this patent is extended or adjusted under 35 U.S.C. 154(b) by 868 days.

(21) Appl. No.: 17/848,323

(22) Filed: Jun. 23, 2022

(65) Prior Publication Data

US 2023/0417004 A1  Dec. 28, 2023

(51) Int. Cl.
*E01H 1/12* (2006.01)

(52) U.S. Cl.
CPC ... *E01H 1/1206* (2013.01); *E01H 2001/1286* (2013.01)

(58) Field of Classification Search
CPC .......... E01H 1/1206; E01H 2001/1286; A01K 27/002; A01K 27/008
USPC ........................................................ 294/1.3
See application file for complete search history.

(56) References Cited

U.S. PATENT DOCUMENTS

| | | |
|---|---|---|
| 893,199 A | 7/1908 | Schaller |
| 1,239,755 A | 9/1917 | Bader |
| 3,310,034 A | 3/1967 | Dishart |
| 3,999,521 A | 12/1976 | Puiello |
| 4,091,766 A | 5/1978 | Colliard |
| 4,584,967 A | 4/1986 | Taplin |
| 4,751,923 A | 6/1988 | Marino |
| 4,957,231 A | 9/1990 | Kalisher |
| D313,677 S | 1/1991 | Hammon et al. |
| 5,184,762 A | 2/1993 | Nevitt |
| 5,297,835 A * | 3/1994 | Wengler ................. B63H 20/36 294/157 |
| D359,598 S | 6/1995 | Forbes |
| 5,467,743 A | 11/1995 | Doose |
| 5,474,033 A | 12/1995 | Mitchell, Jr. |

(Continued)

FOREIGN PATENT DOCUMENTS

| | | |
|---|---|---|
| AU | 2003255178 A1 | 5/2005 |
| AU | 2014100313 A4 | 5/2014 |

(Continued)

OTHER PUBLICATIONS

Arcadia Trail Expandable Backpack Harness, https://www.onlynaturalpet.com/products/arcadia-trail-expandable-backpack-harness?variant=32013065814052, printed Jun. 22, 2022.

*Primary Examiner* — Paul T Chin
(74) *Attorney, Agent, or Firm* — Morriss O'Bryant Compagni Cannon, PLLC (57) ABSTRACT

A system for collecting and containing pet waste, including a carrying case having a first surface and a second surface, wherein the first surface is substantially opposed to the second surface. The carrying case having a first pocket and a second pocket, each of the first and second pockets having an opening and each of the openings are disposed on the first surface, where the first and second pocket extend between the first surface and the second surface such that at least a portion of the first pocket overlaps a portion of the second pocket, and a through hole that extends through the first and second surfaces and is configured to receive a pet harness. The system also includes a scooper retained in one of the first and second pockets of the carrying case and one bag retained in one of the first and second pockets.

50 Claims, 8 Drawing Sheets

(56) References Cited

U.S. PATENT DOCUMENTS

| | | |
|---|---|---|
| 5,560,321 A | 10/1996 | Hess |
| 5,586,521 A | 12/1996 | Kelley |
| D384,780 S | 10/1997 | McLaughlin |
| 5,887,772 A | 3/1999 | Dooley |
| 6,257,473 B1 | 7/2001 | Ringelstetter |
| 6,571,745 B2 * | 6/2003 | Kerrigan .............. A01K 27/008 119/858 |
| D535,817 S * | 1/2007 | Perez ............................ D3/226 |
| 7,918,192 B1 | 4/2011 | Digh et al. |
| D736,482 S | 8/2015 | Apresca |
| 10,617,096 B2 | 4/2020 | Watson et al. |
| 2004/0200438 A1 | 10/2004 | Jeffrey |
| 2005/0072376 A1 * | 4/2005 | Kerrigan .............. A01K 27/002 119/850 |
| 2006/0037562 A1 * | 2/2006 | Woerner .............. A01K 27/002 119/856 |
| 2014/0299073 A1 * | 10/2014 | Batista ................. A01K 27/008 119/856 |
| 2017/0215385 A1 | 8/2017 | Hansen et al. |
| 2019/0364847 A1 * | 12/2019 | Mills .................... A01K 27/002 |
| 2021/0092938 A1 * | 4/2021 | Hill ...................... A01K 27/002 |
| 2023/0247968 A1 * | 8/2023 | Maremont ........... A01K 13/006 119/792 |
| 2025/0017172 A1 * | 1/2025 | Steele, Jr. ........... B05B 11/1028 |

FOREIGN PATENT DOCUMENTS

| | | |
|---|---|---|
| AU | 2020101812 A4 | 4/2021 |
| DE | 102018009373 A1 | 6/2020 |

* cited by examiner

SYSTEM AND METHOD FOR COLLECTING AND CONTAINING PET WASTE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. The Field of the Present Disclosure

The present disclosure relates generally to systems and methods of collecting, containing and disposing of pet waste, such as fecal matter of pets, particularly outdoor pets and/or pets that relieve themselves outdoors, and pets capable of carrying cargo of varying size.

2. Description of Related Art

The present disclosure relates to pet owners, particularly dog owners whose dogs expel waste (i.e. defecate) during a walk which the owner must then dispose of. This process often requires the owner to carry around a plastic bag or several plastic bags on every dog walk, to be prepared, and a tool to scoop up the pet waste from off of the ground and place it into the bag. Alternatively, the owner may use disposable gloves to pick up the waste by hand and dispose of it in the plastic bag.

This traditional process is cumbersome as it forces the owner to carry supplies, and can also be unseemly and for some, nauseating, as the owner must carry around a bag containing dog waste during at least part of a walk, until the soiled bag can be properly disposed of.

The prior art is thus characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

As used herein, the term "pet" shall be defined broadly to include any animal that may be owned or cared for by a person and is capable of wearing a carrying case as described herein.

Applicant has discovered an improved system and method of collecting and containing pet waste, such as fecal matter expelled by pets. Referring to FIGS. 1-4, the system 100 may include a carrying case 100. The carrying case 100 may include a first surface 102 and a second surface 104. The first and second surfaces may be substantially opposed to one another such that the first surface 102 is on a first or top side of the carrying case 100 and the second surface 104 is on a second or bottom side of the carrying case 100.

The carrying case 100 may be made of any desirable material, including but not limited to, for example, canvas, nylon, cloth, or other lightweight material.

The caring case 100 may also include an opening or through hole 105 that may extend through each of the first surface 102 and the second surface 104. The through hole 105 may be configured to receive at least a portion of a pet harness or collar 200 worn by a pet 300, such that opposing end portions 107 and 109 of the carrying case 100 can rest on the sides of the pet 300 during use.

The carrying case 100 may have a length that extends from a first terminating end 107*a* to a second terminating end 109*a*, and has a width that extends from a first edge 120 to a second edge 122. The first edge 120 and the second edge 122 extend from the first terminating end 107*a* to the second terminating end 109*a*. The width of the carrying case 100 may be reduced or less or smaller at a midpoint of the length of the carrying case than at the first terminating end 107*a* or second 107*b*. The through hole 105 may also be disposed or located at, or overlapping with, a midpoint of the first and second surfaces 102 and 104 or at the midpoint of the length of the carrying case.

Figure 2:
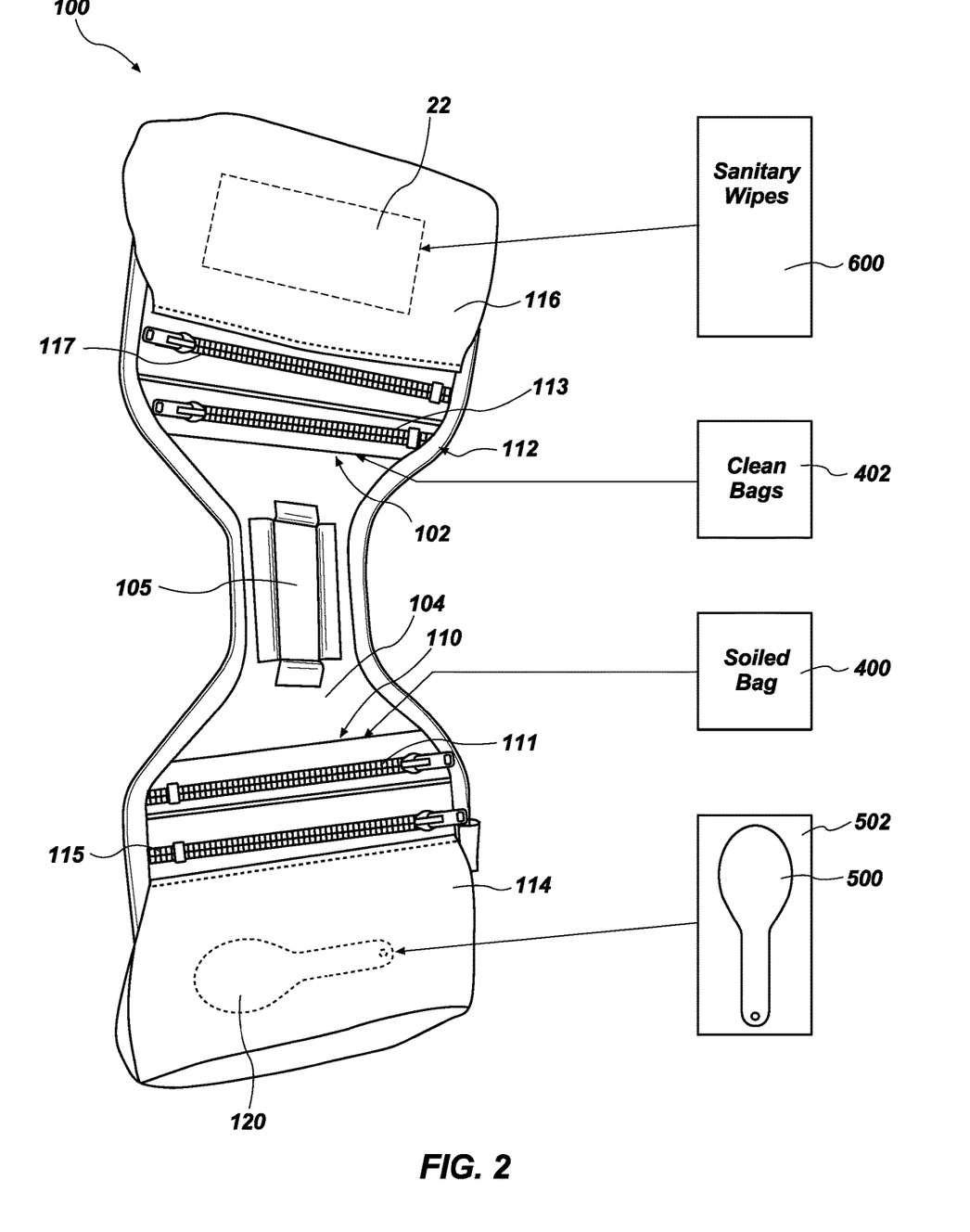
FIG. 2 is an opposing side view of the disclosed carrying case in FIG. 1.
Figure 3A:
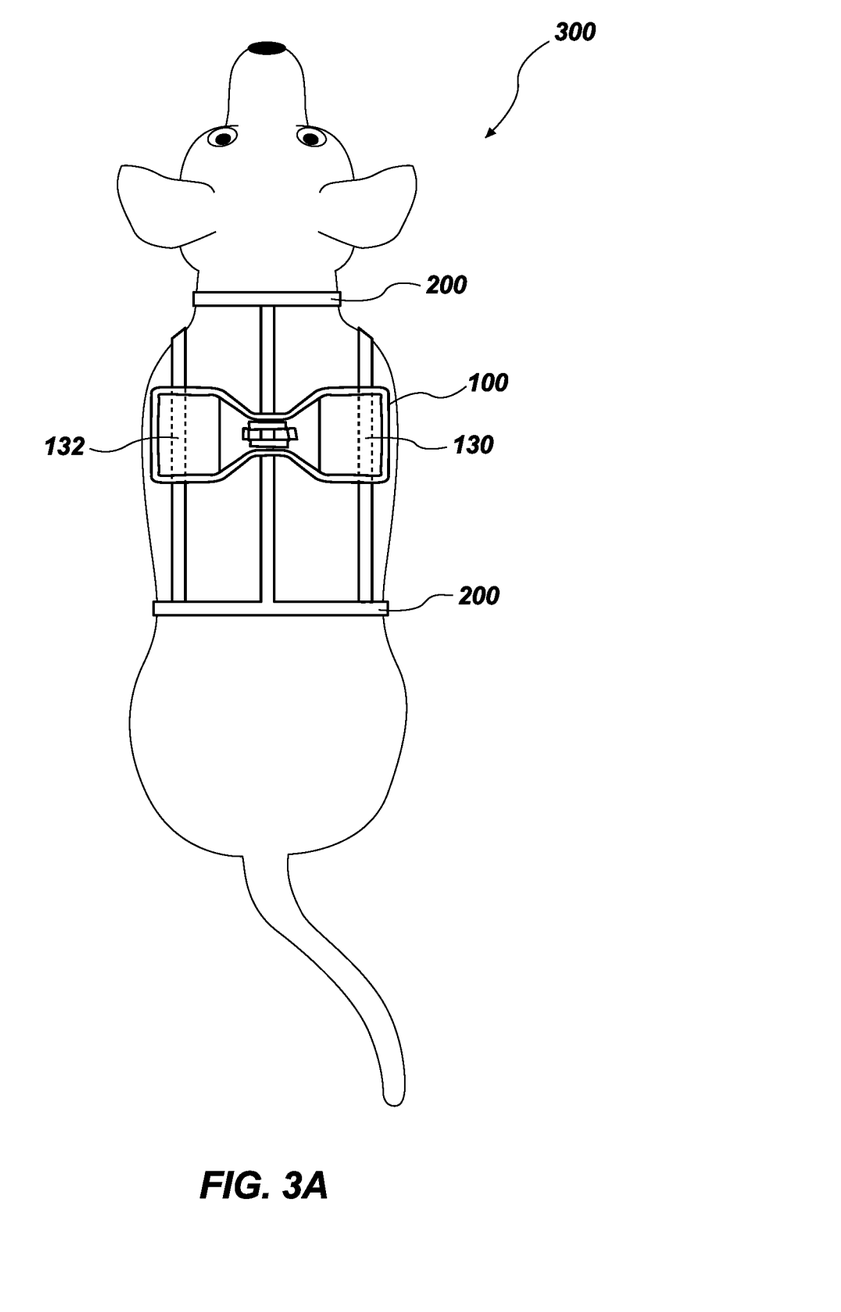
FIG. 3*a* is a top view of the carrying case of FIG. 1, being carried by a pet.
Figure 3B:
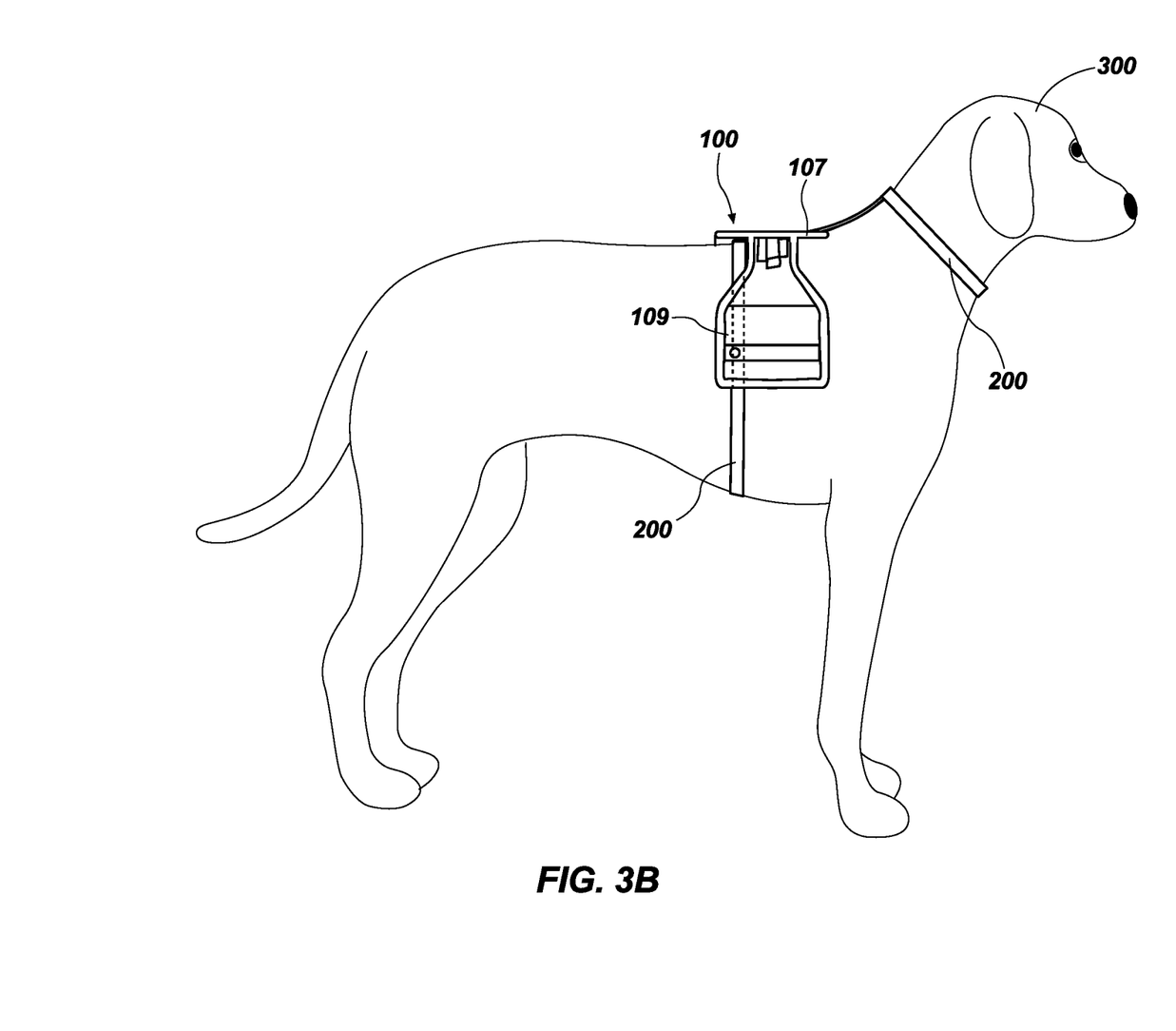
FIG. 3*b* is a side view of the carrying case of FIG. 1, being carried by a pet.

The carrying case 100 may also include a plurality of straps 130 and 132 that can be attached or engaged with the second surface 104 of the carrying case 100. The first strap 130 may have a first end 130a and a second end 130b that are both either fixed, attached or secured to the second surface 104. At least one of the first end 130a and the second end 130b is removably attached to the second surface 104 of the carrying case 100. This removable attachment can be facilitated via a button engagement 130c, snap, zipper, hook and loop, or other removable engagement. Similarly, the second strap 132 may have a first end 132a and a second end 132b that are both either fixed, attached or secured to the second surface 104. At least one of the first end 132a and the second end 132b is removably attached to the second surface 104 of the carrying case 100. This removable attachment can be facilitated via a button engagement 132c, snap, hook and loop, or other removable engagement.

Straps 130 and 132 may be designed and configured to receive at least a portion of the pet harness 200 or collar. The button engagement 130c and 132c enable a user to disengage the strap 130 and 132 from the second surface 104 and then re-secure the button engagement 130c and 132c have a portion of the harness 200 is secured between the strap 130 and 132 and the second surface 104 of the carrying case. This enables the carrying case 100 to more securely attach to a pet during use and can limit the bounce or discomfort of the carrying case 100 as the pet walks or runs.

Figure 1:
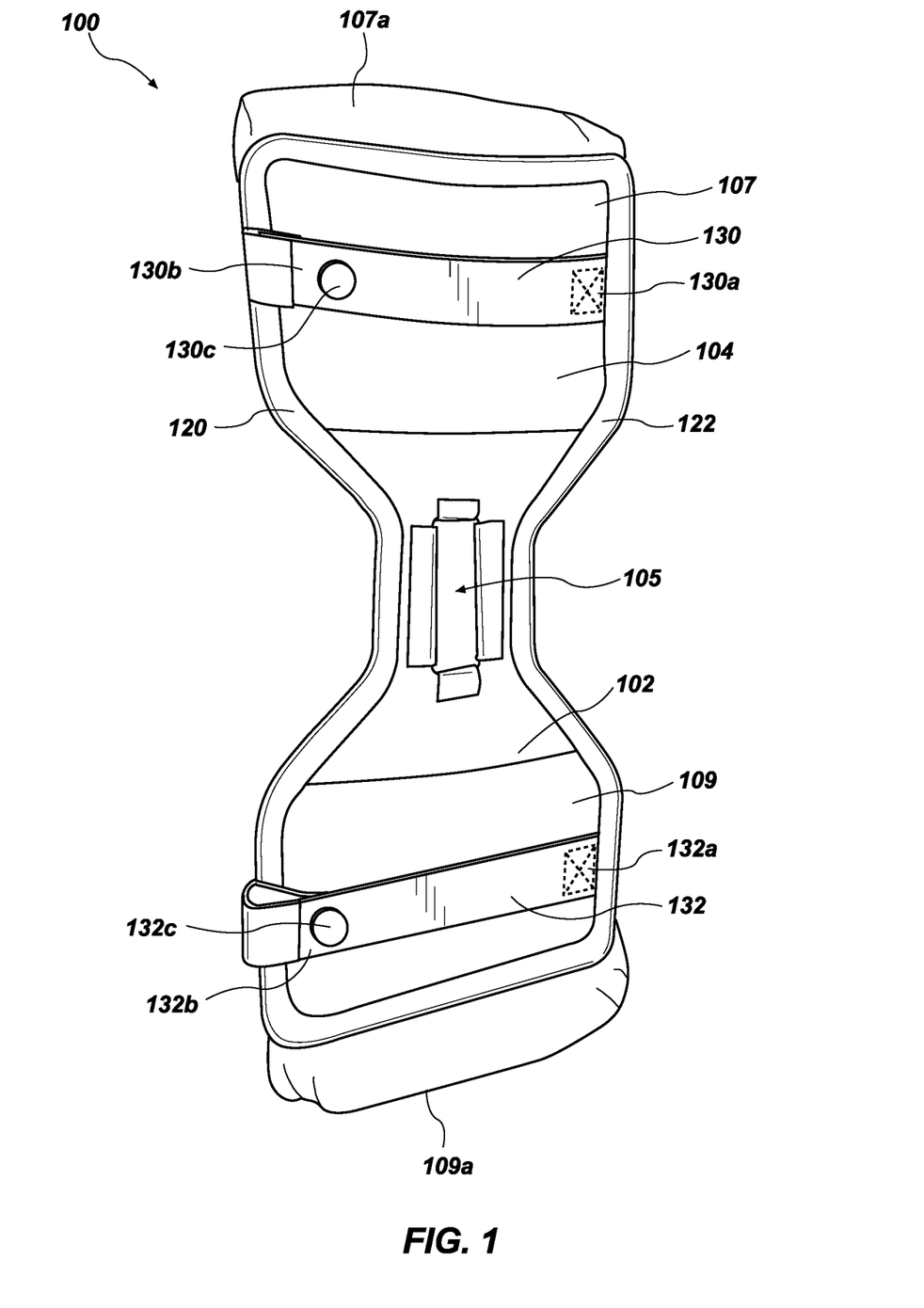
FIG. 1 is a side view of a disclosed carrying case as part of a system for collecting and retaining pet waste.
Figure 4:
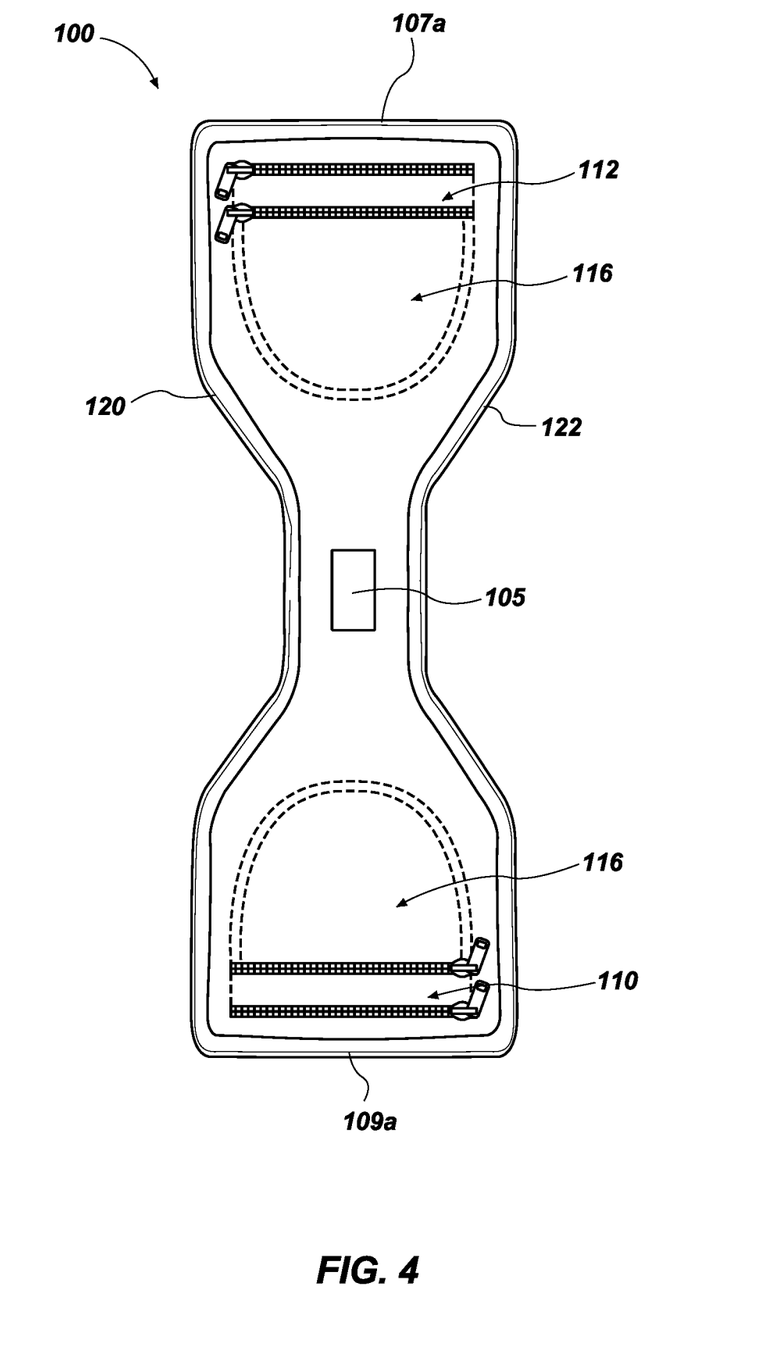
FIG. 4 is a side view of the disclosed carrying case of FIG. 1 showing hidden lines to illustrate pocket locations.

The carrying case 102 includes a series or plurality of pockets 110, 112, 114 and 116. End portions 107 and 109 of the carrying case 102 may each include a plurality or pair of pockets, for example pockets 110 and 114 may be disposed or located on end portion 109 and pockets 112 and 116 may be located or disposed on end portion 109.

Each of the pockets 110, 112, 114, and 116 may have respective openings and each of the openings may be disposed or located on the first surface 102, and each of the pockets 110, 112, 114, and 116 may extend between the first surface 102 and the second surface 104 of the carrying case 100. To facilitate a more space efficient shape, the pockets have be designed and configured to overlap one with another. For example, pocket 114 overlaps at least a portion of the pocket 110, when viewed from the first surface 102, with pocket 110 substantially behind at least a portion of the pocket 114. Pocket 114 may even overlap a majority of pocket 110, if desired. Similarly, pocket 116 overlaps at least a portion of the pocket 112, when viewed from the first surface 102, with pocket 112 substantially behind at least a portion of the pocket 116. Pocket 116 may even overlap a majority of pocket 110, if desired.

Each of pockets 110, 112, 114 and 116 may be designed and configured to be resealable, to open or close each pocket and secure any article that may be stored therein. The openings of each of pocket 110, 112, 114 and 116, may include a zipper, a button or buttons, snap or snaps, hooks and loops, or other desired resealable mechanism that can be used to secure the openings of the pockets closed.

Pockets 110, 112, 114, and 116, may be designed and configured to receive and retain a variety of useful tools and articles. For example, in this disclosed system, pockets 110, 112, 114, and 116, can be used to store and retain soiled bags 400 of pet waste until the soiled bag 400 can be properly disposed, or other clean-up or pet related tools or materials. This type of storage of pet waste causes the pet to carry the soiled bag instead of the pet owner. Additionally, any of pockets 110, 112, 114, and 116, can also store and retain unsoiled or clean bags 402 that have yet to be used but can be carried by the pet 300 during walks or other activities. Bags 400 and 402 may be disposable plastic bags, or resusable bags, or any other desired bags capable of containing and storing pet fecal mater.

In an embodiment of the disclosed system, any of pockets 110, 112, 114 and 116 can also be used to store, retain and secure a scooper 500 that can be covered by a disposable bag 502, which can protect the scooper 500 from being soiled during use. For the purposes of this application, the term "scooper" may be broadly construed to include any tool or lifting member capable of lifting or picking up and transferring pet waste into a bag, for example, but not limited to, a spoon, shovel, spade, or any other any tool capable of picking up and transferring pet waste into a bag. In a best mode of the present disclosure, the scooper 500 is concave. However, the scooper 500 may alternatively be replaced, if desired, by a flat-surface object such as a wide putty knife or other lifting member. The term "lifting member" may therefore be broadly construed to include any tool or device capable of lifting or picking up and transferring pet waste into a bag, including any tool or device having a concave surface, or any tool or device not having a concave surface, or any tool or device having either a flat surface or a non-planer surface.

The scooper 500 can be used to scoop waste into a corresponding disposable bag, such as bags 402. The bag 502 can then be removed and placed into the soiled bag 402 along with the waste. Any of the pockets 110, 112, 114, and 116 can include other pet cleanup material, including sanitary wipes 600 that can be used to clean an owner's hands after the waste has been cleaned up and disposed in a bag 400.

In operation, a user walking a pet 300 secures the carrying case 100 to the pet 300, by inserting a portion of the harness 200 through opening 105 of the carrying case 100. The harness 200 will then secure the carrying case 100 to the pet 300 as the pet walks or moves. A user can then access pockets any of pockets 110, 112, 114 and 116, which can be used to store, retain and secure the scooper 500 that can be covered by a disposable bag 502, which can protect the scooper 500 from being soiled during use. The user can use the scooper 500 to scoop waste into a corresponding disposable bag 402, or soiled bag 400, which can also retain soiled disposable bag 502, after use. The soiled disposable bag 400 can then be stored in pocket 110 or in any other desired pocket 112, 114 or 116. The user may then utilize any of pockets 110, 112, 114, and 116 to store other pet cleanup material, including sanitary wipes 600 that can be used to clean an owner's hands after the waste has been cleaned up and disposed in the soiled bag 400.

Figure 5:
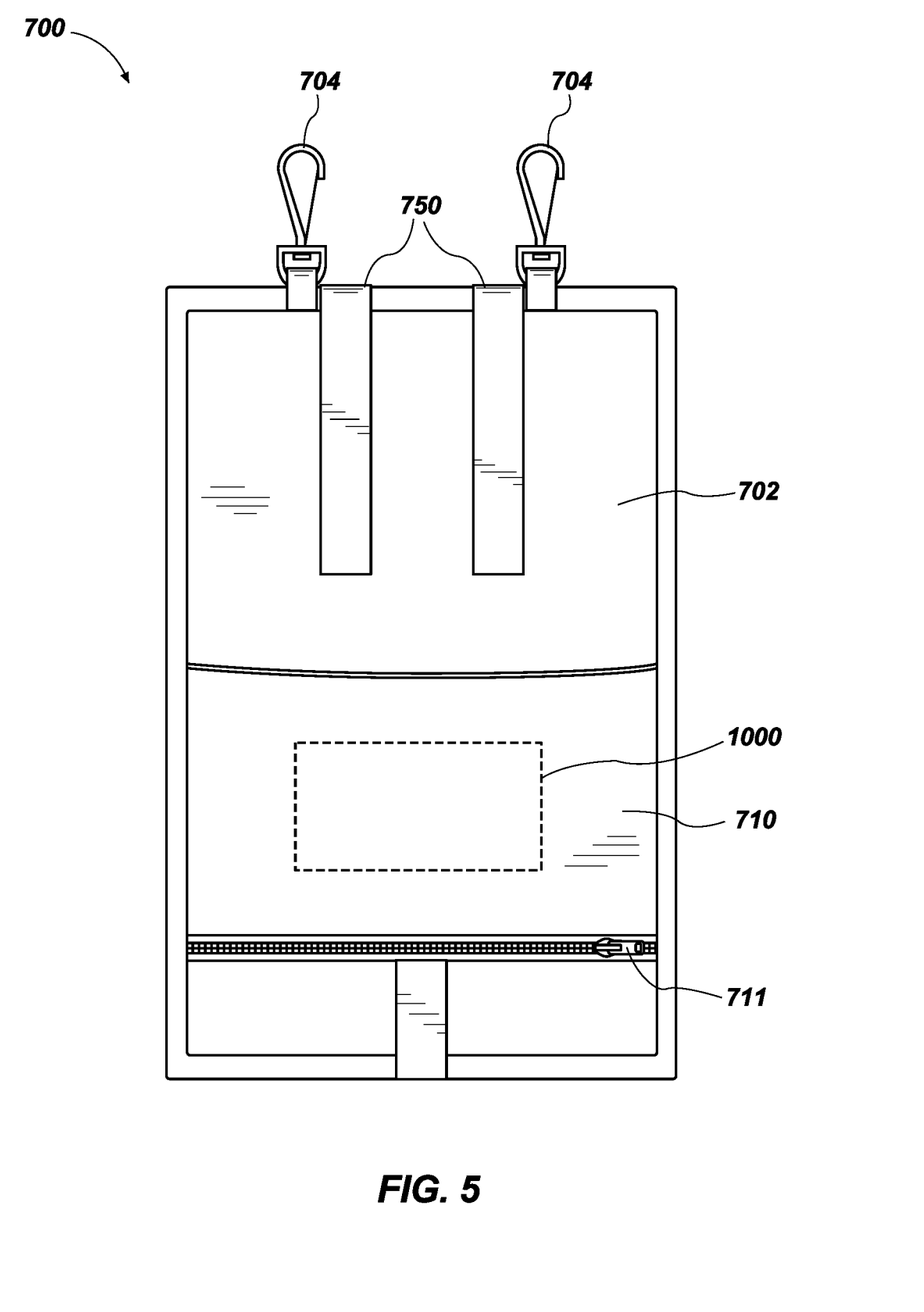
FIG. 5 is a side view of a another embodiment of a disclosed carrying case, as part of a system for collecting and retaining pet waste.
Figure 6:
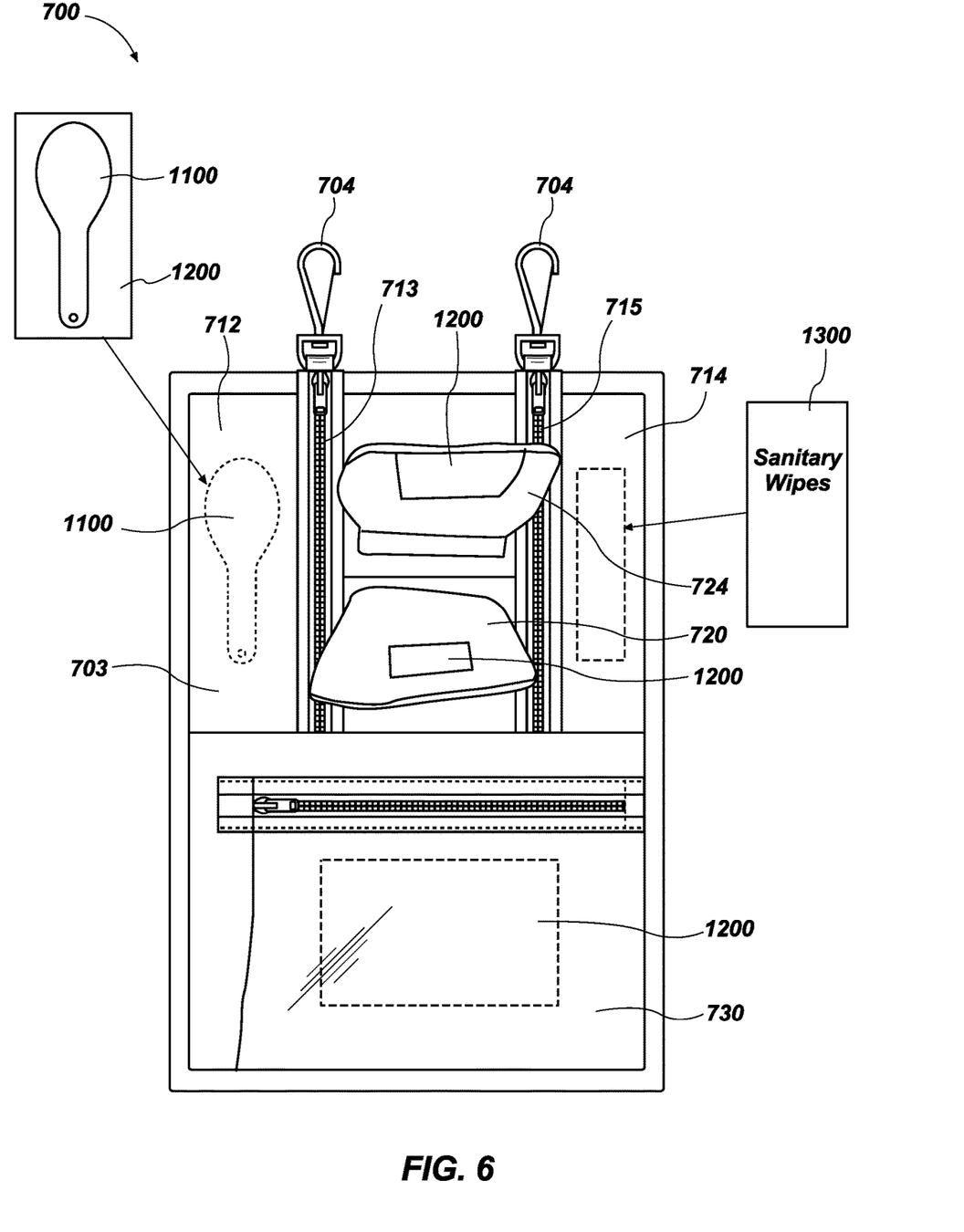
FIG. 6 is an opposing side view of the disclosed carrying case in FIG. 5.
Figure 7:
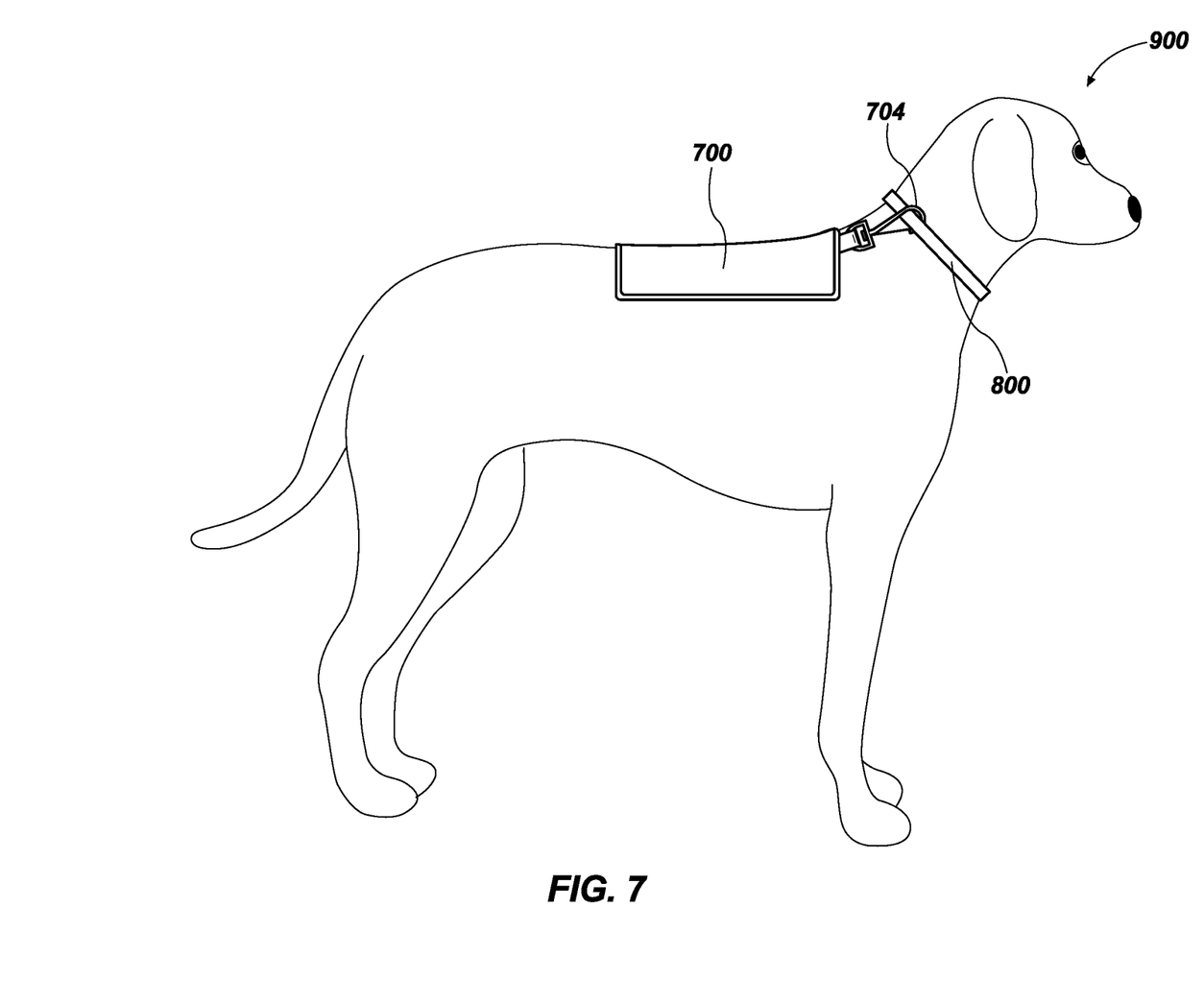
FIG. 7 is a side view of the disclosed carrying case of FIG. 5, being carried by a pet.

Referring now to FIGS. 5-7, another embodiment of the disclosed system includes a carrying case 700 that can include a pair of hooks 704 that are configured to latch onto a pet harness or collar 800 of a pet 900, such that the carrying case 700 rests on the back of the pet 900 during use. The hooks enable a user to easily attach and detach the carrying case 400 from the pet harness 800.

The carrying case 700 may include a plurality of pockets 710, 712 and 714. Any of the pockets 710, 712, and 714 can be used to store or retain a soiled bag 1000 of pet waste until the soiled bag 1000 can be properly disposed. This storage causes the pet 900 to carry the soiled bag 1000 instead of the pet owner. Any of pockets 710, 712, and 714 can also store unsoiled or clean bags 1200 that have yet to be used but can be carried by the pet 900 during walks or other activities.

Any of the pockets 710, 712 and 714 can include a zipper 711 or other means of closing and resealing the pockets 710, 712 and 714, such as hook and loops, buttons, snaps, zipper or other desired mechanisms.

Pocket 710 may be located on a first surface 702 or side of the carrying case 700, whereas on a second surface 703 (or opposing side) of the carrying case 700 may include smaller pockets 712 and 714. The first and second surfaces 702 and 703, respectively, may be substantially opposed to one another such that the first surface 702 is on a first or top side of the carrying case 700 and the second surface 703 is on a second or bottom side of the carrying case 700.

These pockets 712 and 714 can also include corresponding zippers 713 and 715, or other means of closing the pockets 712 and 714. Pocket 112 can include a scooper 1100 that can be covered by a bag 1200, such as a disposable plastic bag, which can protect the scooper 1100 from being soiled during use. The scooper 1100 can be used to scoop waste into a corresponding disposable bag 1200. The disposable plastic bag 1200 can then be removed and placed into the soiled bag 1000 along with the waste. Another pocket 714 can include other pet cleanup material, including, but not limited to sanitary wipes 1300 that can be used to clean the owner's hands after the waste has been cleaned up and disposed in a plastic bag 1000.

Additional pockets 720, 724, and 730 can house additional cleaning supplies, such as extra disposal plastic bags 1200 to cover the scooper 1100 or extra plastic bags 1200 to contain and store pet waste. Additionally pockets 710 and 730 are designed and configured to overlap one another, such that pocket 710 overlaps a majority of pocket 730, which can provide a more economical use of space in the carrying case 700.

The carrying case 700 may also be folded over onto itself, substantially in half, reducing the surface area of the carrying case 700 and making it easier for the corresponding pet to wear and carry. After the carrying case is folded, it can be held in a folded position by removable straps 750 that may be removably secured to opping side of the carrying case via hook and loop fasteners, buttons, snaps, zippers, or any other removably attachment mechanism.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for collecting and containing pet waste, comprising:
   a carrying case, including:
      a first surface and a second surface, wherein the first surface is substantially opposed to the second surface;
      a first pocket and a second pocket, each of the first and second pockets having an opening and each of the openings are disposed on the first surface, and wherein the first and second pocket extend between the first surface and the second surface such that at least a portion of the first pocket overlaps a portion of the second pocket;
      a lifting member retained in at least one of the first and second pockets; and
      at least one bag retained in at least one of the first and second pockets.

2. The system of claim 1, further comprising:
   a first strap having a first end and a second end, wherein at least one of the first end and the second end is attached to the second surface of the carrying case.

3. The system of claim 2, wherein at least one of the first and second ends of the first strap is removably secured the second surface of the carrying case.

4. The system of claim 3, wherein the at least one of the first and second ends of the first strap is removably secured to the second surface via a button engagement.

5. The system of claim 2, wherein the first strap is configured to receive at least a portion of a pet harness.

6. The system of claim 5, wherein the first strap is configured to detachably receive at least a portion of a pet harness.

7. The system of claim 1, wherein at least one of the pockets is configured to retain a soiled bag containing pet waste.

8. The system of claim 1, the first pocket overlaps a majority of the second pocket.

9. The system of claim 1, further comprising:
   at least one sanitation wipe retained in at least one of the first and second pockets.

10. The system of claim 1, wherein the at least one of the first and second pockets includes a zipper configured to close and open the corresponding opening of the first or second opening.

11. The system of claim 1, wherein the through hole is disposed at a midpoint of the first and second surfaces.

12. The system of claim 1, wherein the carrying case has a length that extends from a first terminating end to a second terminating end, and has a width that extends from a first edge a second edge wherein each of the first edge and the second edge extend from the first terminating end to the second terminating end, and wherein the width is less at the midpoint of the length than at the first and second terminating ends.

13. A method for collecting and containing pet waste, including:
   providing a carrying case, including:
      a first surface and a second surface, wherein the first surface is substantially opposed to the second surface;
      a first pocket, a second pocket, and a third pocket, each of the first, second and third pockets having an opening and each of the openings are disposed on the first surface, and wherein the first, second and third pockets extend between the first surface and the second surface;

a first strap having a first end and a second end, wherein at least one of the first end and the second end is removably attached to the second surface of the carrying case via a button engagement, wherein the first strap is configured to receive a pet harness;

providing a lifting member retained in at least one of the first and second pockets;

providing at least one bag retained in at least one of the first and second pockets;

providing a carrying case having a plurality of pockets, storing the lifting member in one of the first and second pockets;

storing the at least one bag in one of the first and second pockets;

using the lifting member to scoop pet waste into the at least one bag; and storing the bag of pet waste in the third pocket.

14. A system for collecting and containing pet waste, comprising:
a carrying case, including:
a first surface and a second surface, wherein the first surface is substantially opposed to the second surface;
a through hole that extends through the first and second surfaces and is configured to receive a pet harness;
a first pocket and a second pocket, each of the first and second pockets having an opening and each of the openings are disposed on the first surface, and wherein the first and second pocket extend between the first surface and the second surface such that at least a portion of the first pocket overlaps a portion of the second pocket;
a lifting member retained in at least one of the first and second pockets; and
at least one bag retained in at least one of the first and second pockets.

15. The system of claim 14, the carrying case further comprising:
a first strap having a first end and a second end, wherein at least one of the first end and the second end is attached to the second surface of the carrying case, wherein the first strap is configured to receive a pet harness.

16. The system of claim 15, wherein at least one of the first and second ends of the first strap is removably secured the second surface of the carrying case.

17. The system of claim 15, wherein the at least one of the first and second ends of the first strap is removably secured to the second surface via a button engagement.

18. The system of claim 15, wherein the first strap is configured to receive at least a portion of a pet harness.

19. The system of claim 14, wherein at least one of the pockets is configured to retain a soiled bag containing pet waste.

20. The system of claim 14, the first pocket overlaps a majority of the second pocket.

21. The system of claim 14, further comprising:
at least one sanitation wipe retained in at least one of the first and second pockets.

22. The system of claim 14, wherein the at least one of the first and second pockets includes a zipper configured to close and open the corresponding opening of the first or second opening.

23. The system of claim 14, wherein the through hole is disposed at a midpoint of the first and second surfaces.

24. The system of claim 14, wherein the carrying case has a length that extends from a first terminating end to a second terminating end, and has a width that extends from a first edge a second edge wherein each of the first edge and the second edge extend from the first terminating end to the second terminating end, and wherein the width is less at the midpoint of the length than at the first and second terminating ends.

25. The system of claim 14, wherein the lifting member is a scooper.

26. A system for collecting and containing pet waste, comprising:
a carrying case, including:
a first surface and a second surface, wherein the first surface is substantially opposed to the second surface;
a first pocket and a second pocket, each of the first and second pockets having an opening and each of the openings are disposed on the first surface, and wherein the first and second pocket extend between the first surface and the second surface;
a first strap having a first end and a second end, wherein at least one of the first end and the second end is removably attached to the second surface of the carrying case via a button engagement, wherein the first strap is configured to receive a pet harness;
a lifting member retained in at least one of the first and second pockets; and
at least one bag retained in at least one of the first and second pockets.

27. The system of claim 26, the carrying case further comprising:
a through hole that extends through the first and second surfaces and is configured to receive a pet harness.

28. The system of claim 26, wherein at least one of the first and second ends of the first strap is removably secured the second surface of the carrying case.

29. The system of claim 26, wherein at least a portion of the first pocket overlaps a portion of the second pocket.

30. The system of claim 26, wherein the first strap is configured to receive at least a portion of a pet harness.

31. The system of claim 26, wherein at least one of the pockets is configured to retain a soiled bag containing pet waste.

32. The system of claim 26, the first pocket overlaps a majority of the second pocket.

33. The system of claim 26, further comprising:
at least one sanitation wipe retained in at least one of the first and second pockets.

34. The system of claim 26, wherein the at least one of the first and second pockets includes a zipper configured to close and open the corresponding opening of the first or second opening.

35. The system of claim 26, wherein the through hole is disposed at a midpoint of the first and second surfaces.

36. The system of claim 26, wherein the carrying case has a length that extends from a first terminating end to a second terminating end, and has a width that extends from a first edge a second edge wherein each of the first edge and the second edge extend from the first terminating end to the second terminating end, and wherein the width is less at the midpoint of the length than at the first and second terminating ends.

37. The system of claim 26, wherein the lifting member is a scooper.

38. The method of claim 13, wherein the lifting member is a scooper.

39. The method of claim 38, the carrying case further comprising:

a through hole that extends through the first and second surfaces and is configured to receive a pet harness.

40. The method of claim 38, wherein at least one of the first and second ends of the first strap is removably secured the second surface of the carrying case.

41. The method of claim 38, wherein at least a portion of the first pocket overlaps a portion of the second pocket.

42. The method of claim 38, wherein the first strap is configured to receive at least a portion of a pet harness.

43. The method of claim 38, wherein at least one of the pockets is configured to retain a soiled bag containing pet waste.

44. The method of claim 38, the first pocket overlaps a majority of the second pocket.

45. The method of claim 38, further comprising:
providing at least one sanitation wipe retained in at least one of the first and second pockets.

46. The method of claim 38, wherein the at least one of the first and second pockets includes a zipper configured to close and open the corresponding opening of the first or second opening.

47. The method of claim 38, wherein the through hole is disposed at a midpoint of the first and second surfaces.

48. The method of claim 38, wherein the carrying case has a length that extends from a first terminating end to a second terminating end, and has a width that extends from a first edge a second edge wherein each of the first edge and the second edge extend from the first terminating end to the second terminating end, and wherein the width is less at the midpoint of the length than at the first and second terminating ends.

49. The system of claim 1, wherein the lifting member is a scooper.

50. A system for collecting and containing pet waste, comprising:
a carrying case, including:
a first surface and a second surface, wherein the first surface is substantially opposed to the second surface;
a first pocket and a second pocket, each of the first and second pockets having an opening and each of the openings are disposed on the first surface, and wherein the first and second pocket extend between the first and second surfaces, wherein at least a portion of the first pocket overlaps a majority of the second pocket, and wherein at least one of the pockets is configured to retain a soiled bag containing pet waste, and wherein at least one of the first and second pockets includes a zipper configured to close and open the corresponding opening of the first or second opening;
a first strap having a first end and a second end, wherein at least one of the first end and the second end is removably attached to the second surface of the carrying case via a button engagement, wherein the first strap is configured to receive a pet harness;
a through hole that extends through the first and second surfaces and is configured to receive a pet harness, and wherein the through hole is disposed at a midpoint of the first and second surfaces;
wherein the carrying case has a length that extends from a first terminating end to a second terminating end, and has a width that extends from a first edge a second edge wherein each of the first edge and the second edge extend from the first terminating end to the second terminating end, and wherein the width is less at the midpoint of the length than at the first and second terminating ends;
a lifting member retained in at least one of the first and second pockets;
at least one bag retained in at least one of the first and second pockets; and
at least one sanitation wipe retained in at least one of the first and second pockets.

* * * * *